July 12, 1927.
J. KÜBLER
1,635,332
DEVICE FOR PREVENTING OXIDATION OF OIL IN TRANSFORMERS
Filed Sept. 2, 1926
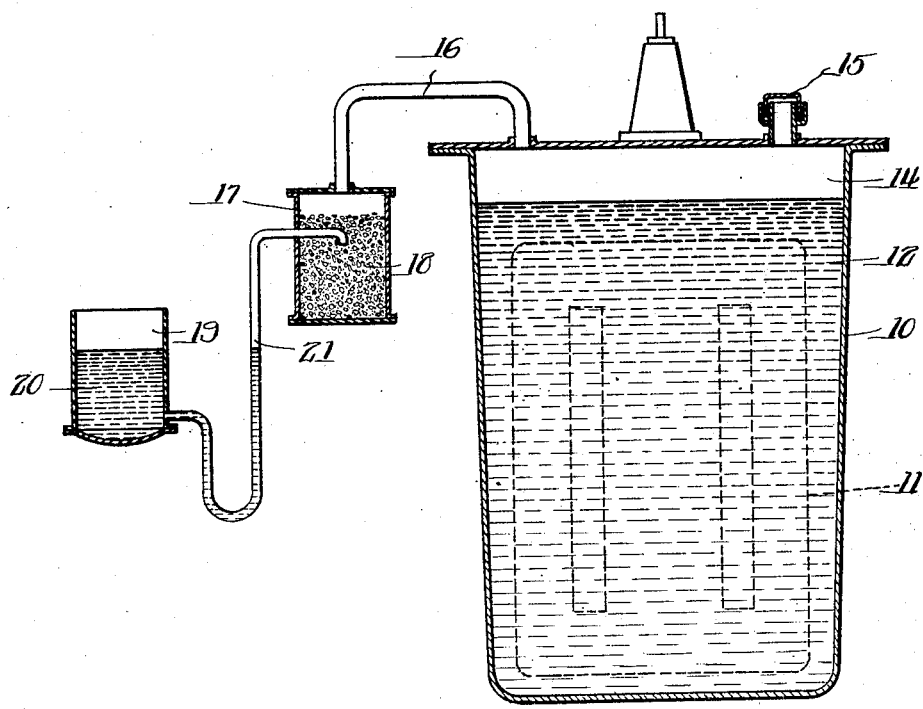
Inventor
Johannes Kübler
By Cromwell ............ Attys Patented July 12, 1927.

1,635,332

UNITED STATES PATENT OFFICE.

JOHANNES KUBLER, OF BADEN, SWITZERLAND, ASSIGNOR TO AKTIENGESELLSCHAFT BROWN BOVERI & CIE., OF BADEN, SWITZERLAND, A JOINT-STOCK COMPANY.

DEVICE FOR PREVENTING OXIDATION OF OIL IN TRANSFORMERS.

Application filed September 2, 1926, Serial No. 133,172, and in Germany September 24, 1925.

This invention relates to the protection of oil in transformers from the oxidizing effect of air.

Transformer tanks are customarily filled with oil to a level sufficient to submerge the transformer, but with an expansion space at the top to function as a relief chamber. Incident to the expansion and contraction of the body of oil and the contained metallic members with changes in temperature, the volume of the expansion space varies, with the result that air is expelled and drawn in, thus subjecting the oil to the oxidizing and vaporizing influences of the air.

The object of the present invention is the provision of an arrangement whereby the oil within the transformer is protected against the contact of air, and hence against the oxidizing and vaporizing effects.

Another object is the provision of an arrangement whereby the expansion space within the transformer tank is kept filled with an inert gas, which is supplied automatically upon an increase in the air space volume.

An important object of the invention is the provision of an arrangement whereby the inert protecting gas is thus automatically supplied without waste of the gas or of the materials from which it is generated.

Other and further objects will be pointed out or indicated hereinafter or will be apparent to one skilled in the art upon an understanding of the invention or its employment in practice.

In the drawing forming a part of this specification, I illustrate in diagrammatic fashion one arrangement of means whereby the invention may be employed, but it is to be understood that the claims are not limited to this particular arrangement.

The figure represents a diagrammatic sectional elevation of apparatus, including a transformer tank.

The nature of the invention will be immediately understood by reference to this illustrative embodiment. The reference numeral 10 designates the transformer tank in which is contained the transformer 11 immersed in a body of oil 12, the tank being filled to a level leaving an expansion space 14 above it. This expansion space is filled with a gas which is inert to the oil, such as carbonic acid gas. This expansion space is sealed against ingress of air, but a sealed vent device 15 is provided to relieve excessive pressures within the tank. The tube 16 connects the expansion space 14 with a generator 17 containing calcium carbonate 18. The generator 17 is connected to a vessel 19 containing hydrochloric acid 20, the level of which is below the outlet of a siphon or trap tube 21 connecting the vessel 19 with the generator 17. The form of the trap or siphon tube 21 is such that some of the hydrochloric acid will be drawn into the generator 17 upon the occurrence of a predetermined negative pressure therein. Consequently, upon the increase of the volume of the expansion space 14, such negative pressure will be produced, some of the hydrochloric acid drawn into the calcium carbonate, and carbonic acid gas generated in the chemical reaction, which gas is drawn into the expansion space 14, thus preserving the inert atmosphere over the body of oil. In the event of the development of an excessive pressure within the transformer tank, the pressure is relieved through the vent 15, which however, prevents the ingress of air. It will be observed that the device operates automatically and with certainty without supervision, excepting the periodic replenishment of the materials in the generator 17 and the vessel 19. Unnecessary consumption of the materials is prevented by the arrangement whereby they are not brought into combination excepting upon the occurrence of a predetermined negative pressure in the expansion space.

What I claim is:

1. Protective apparatus comprising, in combination with a vessel having a closed expansion space, a gas generator communicating with the expansion space, a reagent container, materials in the generator and container for generating an inert gas, there being a connection between the generator and container permitting flow of material from the latter into the former under a predetermined suction from the expansion space.

2. Protective apparatus comprising the combination with a closed vessel, of a generator communicating therewith, a reagent container, materials in the generator and container for generating an inert gas, and a connection between the container and generator permitting passage of material from the former to the latter under suction from the vessel, said connection including a trap portion.

3. The combination with a transformer tank, of a generator communicating therewith, a reagent container, materials in the generator and container for generating an inert gas, and a connection between the generator and container for passage of material from the latter into the former, said connection having its outlet in the generator above the surface level of the material in the container.

4. In combination with a closed transformer tank, a generator in communication therewith, a reagent container, materials in the generator and container for generating an inert gas, and a connection for passage of material from the container into the generator, said connection affording a flow limiting portion.

In testimony whereof I have hereunto subscribed my name at Zurich, Switzerland, this 12 day of August, A. D. 1926.

JOHANNES KUBLER.